July 29, 1924.
P. T. LINDHARD
1,503,193
ROTARY COOLER FOR CEMENT CLINKERS, ETC
Filed Jan. 6, 1923
3 Sheets-Sheet 2
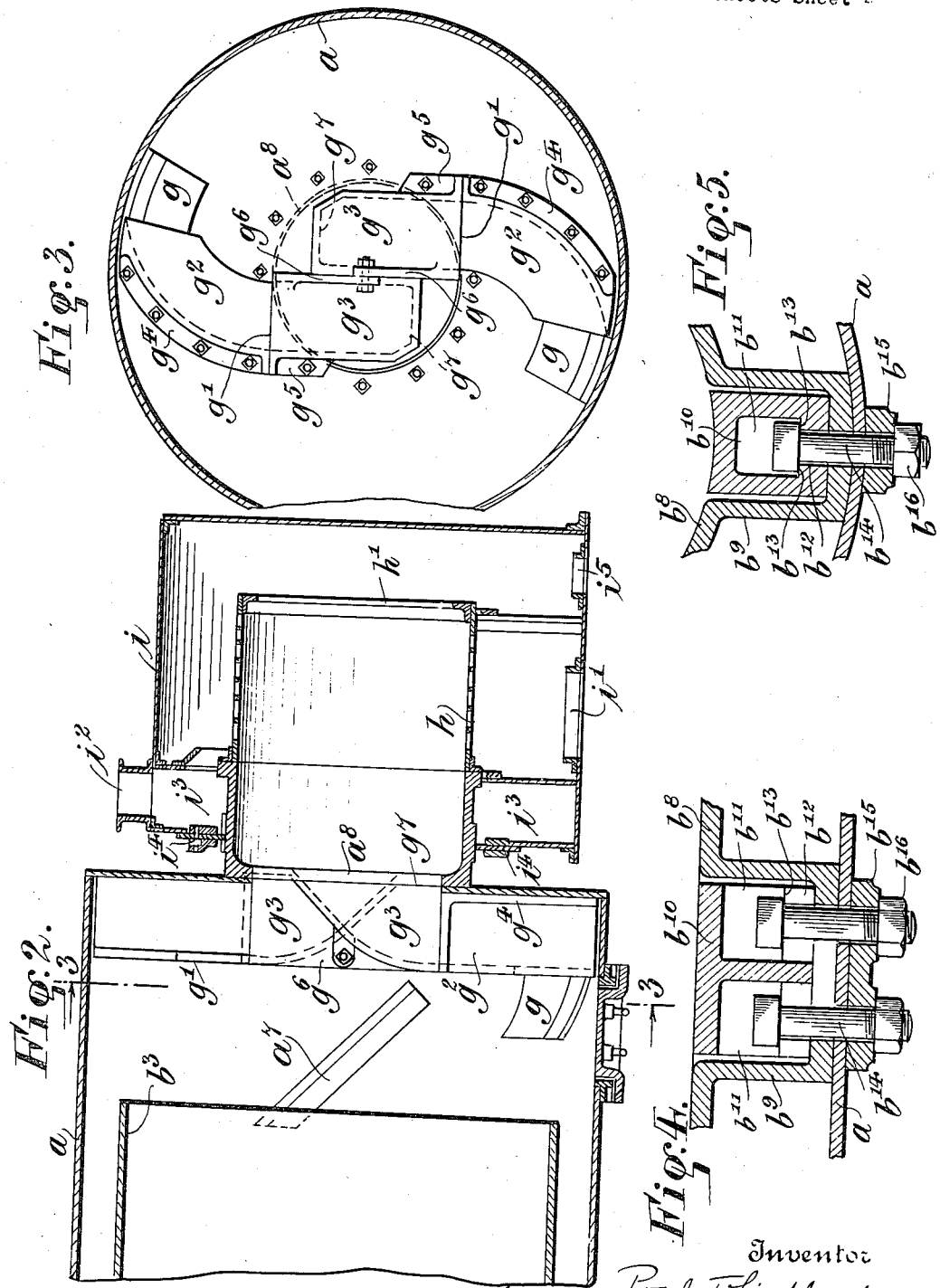

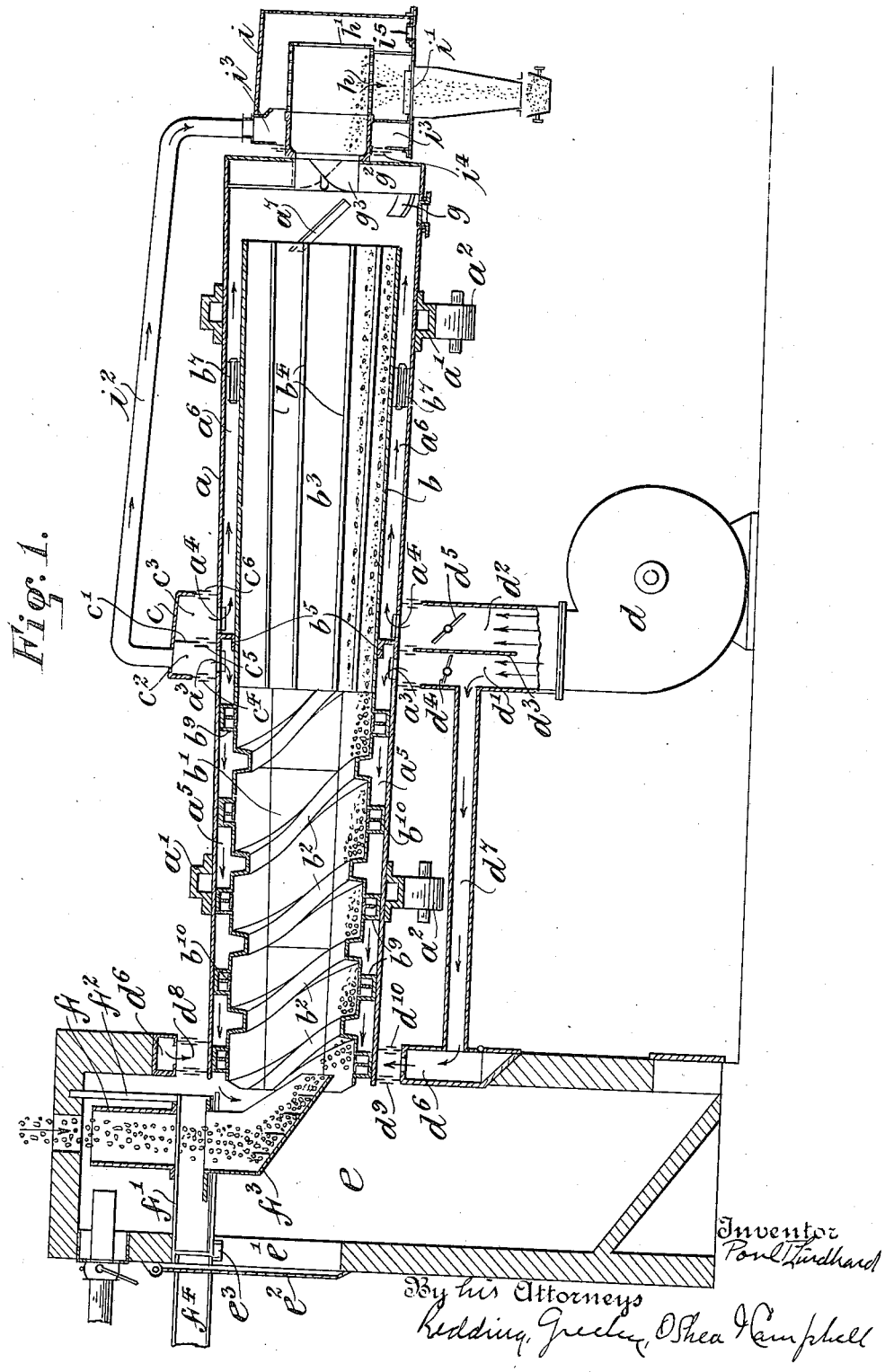

July 29, 1924.
P. T. LINDHARD
1,503,193
ROTARY COOLER FOR CEMENT CLINKERS, ETC
Filed Jan. 6, 1923
3 Sheets-Sheet 3
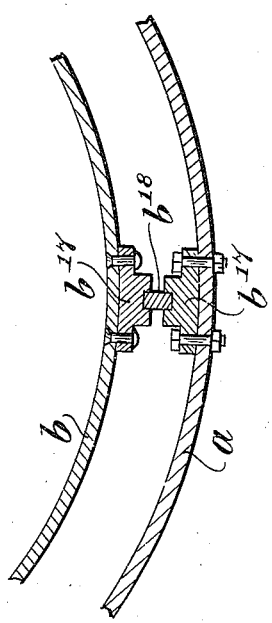
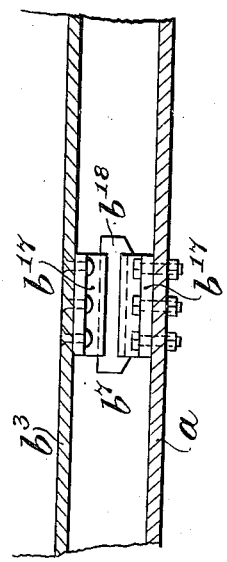
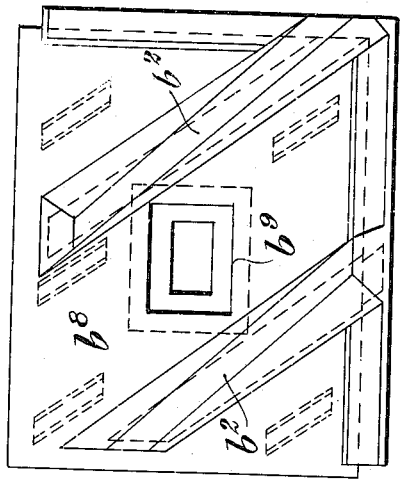
Inventor
Poul T. Lindhard
By his Attorneys
Redding, Greeley, O'Shea Campbell Patented July 29, 1924.

1,503,193

UNITED STATES PATENT OFFICE.

POVL T. LINDHARD, OF BROOKLYN, NEW YORK, ASSIGNOR TO F. L. SMIDTH & CO., OF NEW YORK, N. Y., A CORPORATION OF NEW JERSEY.

ROTARY COOLER FOR CEMENT CLINKERS, ETC.

Application filed January 6, 1923. Serial No. 610,996.

*To all whom it may concern:*

Be it known that I, POVL T. LINDHARD, a citizen of the United States, residing in the borough of Brooklyn of the city of New York, in the State of New York, have invented certain new and useful Improvements in Rotary Coolers for Cement Clinkers, Etc., of which the following is a specification, reference being had to the accompanying drawings, forming a part hereof.

This invention relates to rotary coolers of the general type of that shown in Letters Patent of the United States No. 1,049,610 dated January 7, 1913, in which the cooling of clinker from a cement kiln is effected by causing the clinker or other material to be cooled to pass through a cylindrical or substantially cylindrical rotating shell in contact with the cooling air which is caused to pass through the shell in the opposite direction. Heretofore such coolers have sometimes consisted of a single shell, with which the hot clinker or other material is in direct contact, so that the radiation of heat from the outside of the shell is excessive and so that also the shell is subject, with the variations in temperature, to excessive expansion and contraction lengthwise with consequent injurious effect on the supporting devices for the shell and on the air sealing devices. In the construction shown in the patent above mentioned the shell of the cooler is doubled and the clinker is delivered from the discharge end of the inner shell to the annular space between the inner shell and the outer or main supporting shell and is caused to travel in such annular space toward the longitudinal middle of the shell where it is finally discharged, while the cooling air is introduced first into such annular space and passes thence into the interior of the inner shell. In this construction, although the temperature of the clinker has been considerably reduced when it passes from the inner shell to the annular space, the contact of the still heated clinker with the outer shell occasions to some extent the objectionable results above set forth with respect to the single shell. Moreover, since the inner shell is rigidly secured to the outer shell at its ends, the trouble due to lengthwise expansion and contraction is somewhat increased.

The primary object of this invention is to provide such a construction that the clinker shall be kept out of contact with the outer or main or supporting shell at all points thereby preventing the undue heating of the outer shell and the objectionable expansion and contraction thereof lengthwise, while the inner shell is connected to the outer shell only at a point or points between its ends and the inner shell is so supported within the outer shell as to permit the end portions of the inner shell to expand or contract lengthwise without affecting the outer shell. Provision is also made for the better control of the cooling air. Other features of improvement in details or construction and arrangement will be referred to more particularly hereinafter.

The invention is illustrated as embodied in a convenient and practical form in the accompanying drawings in which—

Figure 1 is a view in longitudinal, central section of a cooler constructed in accordance with the invention.

Figure 2 is a detail, also in longitudinal, central section but on a larger scale, of the discharge end of the cooler.

Figure 3 is a view of the same in section on the plane indicated by the broken line 3—3 of Figure 2.

Figures 4 and 5 are detail views in section and on a relatively large scale of the devices by which the sections of the liner or upper part of the inner shell are secured to the outer shell.

Figure 6 is a face view of one section of the liner.

Figures 7 and 8 are detail views of one of the blocks by which the inner shell, near its lower end, is supported on the outer shell.

In the embodiment of the invention illustrated the outer or main or supporting shell $a$ is shown as slightly tapered, but obviously it might be truly cylindrical and may be so regarded. As will be noted, this shell is not stepped, as is the outer shell shown in said Letters Patent, but is continuous from end to end. It is supported as usual by riding rings or tires $a'$ which rest on rollers $a^2$, movement of rotation being imparted to the shell in any suitable manner. Within the outer shell and separated therefrom by an annular space, is the inner shell $b$ which may be regarded as a unit although, as shown in the drawings, it preferably comprises one portion $b'$ provided with spiral conveying ribs $b^2$, substantially as shown in said Letters Patent, and a second longitudinal portion $b^3$, provided with longitudinal internal lifting ribs $b^4$. The upper section of the inner shell or the liner is preferably constructed in sections, substantially as described and shown in said Letters Patent, the devices by which each section is secured to the outer shell being preferably constructed as will be described hereinafter.

Whatever may be the particular construction of the inner shell $b$, it is secured to the outer shell $a$ at a point between its ends, by any suitable means, such as the devices shown at $b^5$. It is supported by the outer shell near its lower or discharge end, as by supporting blocks indicated at $b^7$, to be described hereinafter, which permit relative longitudinal movement of the two shells at such points, so that the inner shell, which is in direct contact with the hot clinker and is subject to considerable variations in temperature, can expand and contract without in any manner affecting the outer shell, either with respect to its supporting devices or with respect to the air sealing devices.

At about the middle of its length the outer shell $a$ is provided, on opposite sides of the rigid annular connection $b^5$, between the inner and outer shells, with two series $a^3$ and $a^4$, of air inlet ports which communicate respectively with the annular spaces $a^5$ and $a^6$ between the two shells. Both series of air inlet ports are covered by an annular header $c$ which is provided with an annular partition $c'$ to form separate annular distributing chambers $c^2$ and $c^3$, and with air sealing rings of usual construction at $c^4$, $c^5$ and $c^6$. These annular headers receive air under pressure, through a double conduit $d'$, $d^2$, from a source $d$ of air under pressure. A partition $d^3$ separates the two parts $d'$, $d^2$ of the conduit, which communicate respectively with the series of air inlets $a^3$ and the series of air inlets $a^4$ through the distributing chambers $c^2$ and $c^3$, and each part of the double conduit is preferably provided with a damper $d^4$ $d^5$, so that the delivery of cooling air to the annular chambers $a^5$ and $a^6$ can be regulated as desired.

The feeding ends of the shells are extended into a dust chamber $e$. The outer shell $a$ is extended through an annular air header $d^6$ which receives air from the source of supply $d$ through a suitable conduit $d^7$. The air under pressure is delivered from the annular header $d^6$ to the annular space $d^8$ formed between two sealing rings $d^9$ and $d^{10}$ so that the escape of dust from the dust chamber at this point is effectively prevented.

The hot clinker or other material to be cooled is delivered from the kiln or other source through a chute $f$ which is supported on two I-beams, one of which is shown at $f'$. One end of each of such I-beams is fixed in the wall of the dust chamber $e$ and the other or inner end is suspended from the top of the dust chamber by means of a suspension bar $f^2$ which permits the inner end of the beam to move freely under the influence of expansion or contraction. The I-beams $f'$ also support movably a chute $f^3$ which receives the material delivered through the chute $f$ and discharges it into the open feeding end of the inner shell $b'$. The wall of the dust chamber is provided with an opening $e'$ closed by a door $e^2$, the opening being of such size that the chute $f^3$ can be withdrawn readily for replacement when required, other I-beams $f^4$, when the door $e^2$ is opened being supported at their inner ends upon brackets $e^3$, so that the chute $f^3$ can then be removed readily by sliding it along the flanges of the I-beams $f'$, $f^4$.

The discharge end of the inner shell $b^3$ is not extended to the end of the main or supporting shell $a$, but is stopped short thereof, as shown in Figures 1 and 2, the cooled clinker which is discharged therefrom being moved on by the conveyor ribs $a^7$ provided at this point on the inner surface of the shell $a$. The latter has a central discharge opening as at $a^8$ and the shell $a$ is provided with scoops $g$ and lifters $g'$ which pick up the clinker as it is discharged from the inner shell $b^3$ and deliver it to the cylindrical screen $h$ which is secured to the end of the shell $a$ and rotates within a hood $i$. The smaller pieces of clinker pass through the screen $h$ and are discharged through an opening $i'$ in the bottom of the hood $i$, while the larger pieces of clinker, which cannot pass through the screen $h$, are discharged through the opening $h'$ of the screen and thence through an opening $i^5$ provided therefor in the hood $i$.

Each lifter $g'$ is preferably formed of two parts $g^2$ and $g^3$, each part $g^2$ being preferably curved as shown and provided with a flange $g^4$ by which it is bolted to the end of the shell $a$, and each part $g^3$ being also formed with a flange, as at $g^5$, by which it is bolted to the end of the shell and with a flange as at $g^6$ by which it can be bolted to the other corresponding part $g^3$. Each part $g^3$ has a substantially rectangular opening as at $g^7$ through which and through the opening $a^8$ in the end of the shell the clinker is discharged into the screen as stated.

The annular air chamber $c^2$ is preferably connected by a suitable pipe $i^2$ with the annular air chamber $i^3$ of the hood $i$ so as to prevent the escape of dust through the sealing ring $i^4$ which closes the joint between the screen $h$ and the hood $i$.

As shown in Figures 1 and 6 the liner section $b'$ of the inner shell is preferably formed in substantially rectangular cast sections $b^8$, substantially as shown in said Letters Patent, but each section is secured independently to the shell $a$ preferably by the fastening devices shown in Figures 4, 5 and 6. As there shown, each section $b^8$ is formed centrally with a boss $b^9$ which receives a hollow block $b^{10}$, open at its ends, as at $b^{11}$, and slotted through its bottom, as at $b^{12}$ so as to form inturned lips $b^{13}$. Headed bolts $b^{14}$ are engaged with the block $b^{10}$ as shown before the same is seated in the boss $b^9$ and are then passed through holes in the shell $a$, receiving externally of the shell, a washer $b^{15}$ and a nut $b^{16}$ whereby each section of the liner is held securely in place. As fully disclosed in said Letters Patent, each section overlaps on two sides the adjoining sections, with sufficient clearance between the abutting edges of the sections to permit expansion of each section under the influence of the hot clinker.

The supporting blocks $b^7$ for the lower end of the inner shell $b^8$ preferably comprise flanged members $b^{17}$ bolted to the outer shell and the inner shell in pairs, and formed with key ways to receive a key $b^{18}$ by which the inner shell is supported from the outer shell and held from circumferential displacement while it is free for longitudinal movement.

In operation it will be understood that the clinker or other material to be cooled is delivered through the chutes $f$ and $f^3$ into the upper or feeding end of the inner or liner section $b'$ and by the rotation of the supporting shell is carried onward and delivered to the lower portion of the inner shell and eventually is discharged therefrom as already described. The cooling air, supplied from the source $d$, is discharged in part through the annular chamber $a^6$ and passes from the annular chamber into the open lower end of the inner shell and thence onward to the dust chamber. The cool air admitted to the annular chamber $a^6$ protects the main or outer shell from the effects of the heat within and prevents radiation of heat from the outer shell into the room in which the cooler is set up. The outer shell, not being in contact with the clinker until the clinker has become well cooled, is not subject to the destructive effect of high temperature and is not subject to such expansion and contraction, by reason of variations of temperature, as would affect injuriously the supporting devices and the air sealing devices. The inner shell, however, being in contact with the clinker, is necessarily affected by the temperature but, being secured to the outer shell only at a point between its ends, and free to expand and contract independently of the outer shell, does not subject the outer shell to the strains to which it would be subjected if the inner shell were secured at both ends to the outer shell.

Cooling air from the source of supply $d$ is also directed through the annular chamber $a^5$, between the upper portion of the outer shell and the liner or the inner shell and serves also to protect the outer shell from the injurious effect of high temperature and to prevent radiation. Through the provision of the partition or diaphragm $d^3$ in the air conduit either with or without one or the other of the dampers $d^4$, $d^5$, the distribution of air between the annular chambers $a^5$ and $a^6$ can be controlled as conditions of operation may require. Air is also directed, as described, to the sealing chambers $i^3$ and $d^6$, preventing, by the maintenance of suitable air pressure at these points, the escape of dust through the sealing rings.

It will be understood that various changes in details of construction and arrangement can be made to suit different conditions of use, and that the invention, except as pointed out in the claims, is not restricted to the particular construction shown and described herein.

I claim as my invention:

1. In a rotary cooler, the combination of an outer supporting shell, an inner shell separated therefrom by an annular space, and supported thereby, the inner shell being free at its discharge end from the outer shell, means to discharge the cooled material from the outer shell, and means to supply cooling air to the annular space between the inner shell and the outer shell at the end opposite the discharge end.

2. In a rotary cooler, the combination of an outer supporting shell, an inner shell secured to the outer shell at a point between its ends and at other points free for relative longitudinal movement, the inner shell being free at its discharge end from the outer shell, means to discharge the cooled material from the outer shell, and means to supply cooling air to said annular space at the end opposite the discharge end.

3. In a rotary cooler, the combination of an outer supporting shell, an inner shell separated therefrom by an annular space and secured thereto at a line between the ends of the outer shell and of the inner shell, means to discharge the cooled material at the discharge end of the outer shell, and means to supply cooling air to said annular space on opposite sides of the line of attachment of the inner shell to the outer shell.

4. In a rotary cooler, the combination of an outer supporting shell, an inner shell separated therefrom by an annular space and secured thereto at a line between the ends of the outer shell and of the inner shell, means to discharge the cooled material at the discharge end of the outer shell, the outer shell having air inlets at opposite sides of the line at which the inner shell is secured to the outer shell, an annular header covering both of said series of openings and having a partition between the series, and means to supply cooling air to said annular header.

5. In a rotary cooler, the combination of an outer supporting shell, a liner composed of co-operating sections, each section having a central boss, a hollow, inwardly lipped block in each such boss and a headed bolt engaging the lips of the block and extended outwardly through the outer shell and receiving a nut externally of the outer shell.

6. In a rotary cooler, the combination of an outer shell having a discharge opening in its lower end, an inner shell supported by the outer shell with an annular space between and stopped short of the end of the outer shell, and a scoop and lifter secured to the outer shell to receive the material discharged from the end of the inner shell and discharge the same through the opening in the end of the outer shell.

7. In a rotary cooler, the combination of an outer shell having a discharge opening in its lower end, an inner shell supported by the outer shell and separated therefrom by an annular space and stopped short of the end of the outer shell, means to discharge to the opening in the end of the outer shell the material discharged into the outer shell from the inner shell, and a cylindrical screen secured to the outer shell to receive the material from the opening in the end thereof.

8. In a rotary cooler, the combination of an outer shell having a discharge opening in its lower end, an inner shell supported by the outer shell and separated therefrom by an annular space and stopped short of the end of the outer shell, means to discharge to the opening in the end of the outer shell the material discharged into the outer shell from the inner shell, a cylindrical screen secured to the outer shell to receive the material from the opening in the end thereof, and a dust hood surrounding the cylindrical screen.

9. In a rotary cooler, the combination of an outer shell having a discharge opening in its lower end, an inner shell supported by the outer shell and separated therefrom by an annular space and stopped short of the end of the outer shell, means to discharge to the opening in the end of the outer shell the material discharged into the outer shell from the inner shell, a cylindrical screen secured to the outer shell to receive the material from the opening in the end thereof, a dust hood surrounding the cylindrical screen and having an annular air sealing chamber, and means to deliver air to said chamber.

10. In an apparatus of the character described, the combination of a rotary shell, a dust chamber into which the rotary shell is projected, a chute to deliver material into the shell, and ways supported within the shell and upon which the chute is movably supported, the dust chamber having an opening and door to permit the removal of the chute on said ways.

11. In an apparatus of the character described, the combination of a rotary shell, a dust chamber into which the rotary shell is projected, a chute to deliver material into the shell, ways upon which the chute is movably supported, said ways being fixed at one end in the wall of the dust chamber, and suspension bars movably supporting the other ends of said ways within the dust chamber, the wall of the dust chamber having an opening and door to permit the removal of the chute on said ways.

12. In a rotary cooler, the combination of an outer shell having a central discharge opening, an inner shell supported within the outer shell with an annular space between, and a scoop and lifter carried by the outer shell to receive the material delivered by the inner shell and discharge the same through the central opening of the outer shell.

13. In a rotary cooler, the combination of an outer shell having a central discharge opening, an inner shell supported within the outer shell with an annular space between, and a scoop and lifter carried by the outer shell to receive the material delivered by the inner shell and discharge the same through the central opening of the outer shell, the lifter consisting of a flanged curved section and a flanged discharge section bolted to the end wall of the outer shell.

This specification signed this 5th day of January, A. D. 1923.

POVL T. LINDHARD.